United States Patent [19]

Ardison

[11] Patent Number: 5,788,049

[45] Date of Patent: Aug. 4, 1998

[54] DIVERGENT CONTACT CABLE CAN HANDLING APPARATUS

[75] Inventor: Paul Lawrence Ardison, Merced, Calif.

[73] Assignee: FMC Corportion, Chicago, Ill.

[21] Appl. No.: 559,122

[22] Filed: Nov. 17, 1995

[51] Int. Cl.⁶ .................................................. B65G 47/24
[52] U.S. Cl. .................................. 198/408; 198/415
[58] Field of Search ................................. 198/408, 407, 198/406, 415, 690.1; 414/757

[56] References Cited

U.S. PATENT DOCUMENTS

| 3,312,326 | 4/1967 | Huppenthal | 198/33 |
| 3,332,724 | 7/1967 | Doucet | 198/406 X |
| 3,462,001 | 8/1969 | Boyce | 198/33 |
| 3,640,375 | 2/1972 | Reimers | 198/33 |
| 3,642,111 | 2/1972 | Reimers et al. | 198/21 |
| 4,696,387 | 9/1987 | Durchenwald | 198/406 X |
| 5,040,662 | 8/1991 | Clark et al. | 198/408 |

*Primary Examiner*—Donald W. Underwood
*Attorney, Agent, or Firm*—Ronald C. Kamp

[57] ABSTRACT

Articles, having a cylindrical shape, such as cans, are rotated from a horizontal position to a vertical position as they are transported between a pair of contact cables. The contact cables are set to diverge above a take away conveyor and at this point the cans will rotate. A magnetic assist device is positioned proximate the take away conveyor to assist can rotation and stabilize the cans on the take away conveyor.

6 Claims, 1 Drawing Sheet

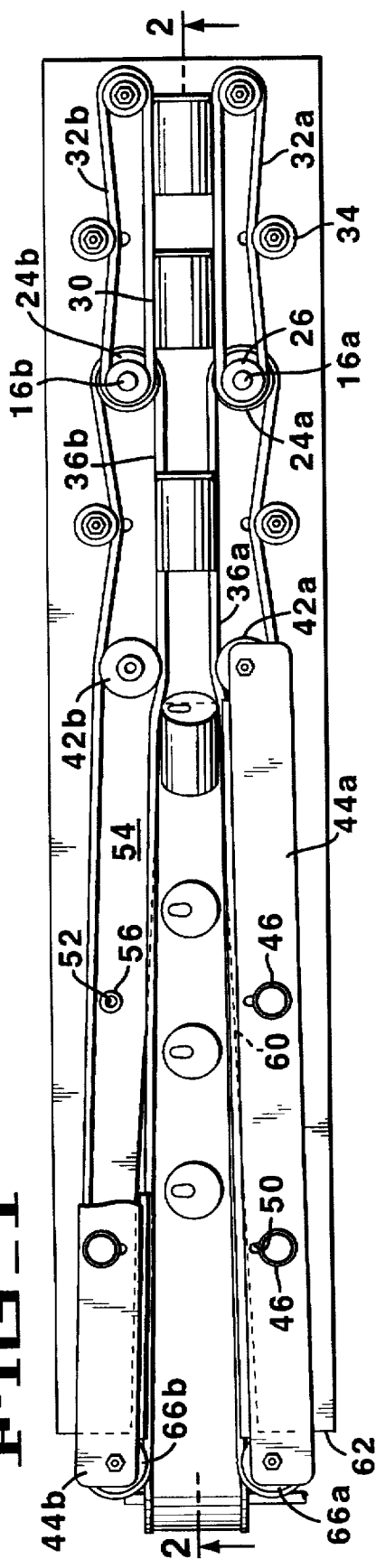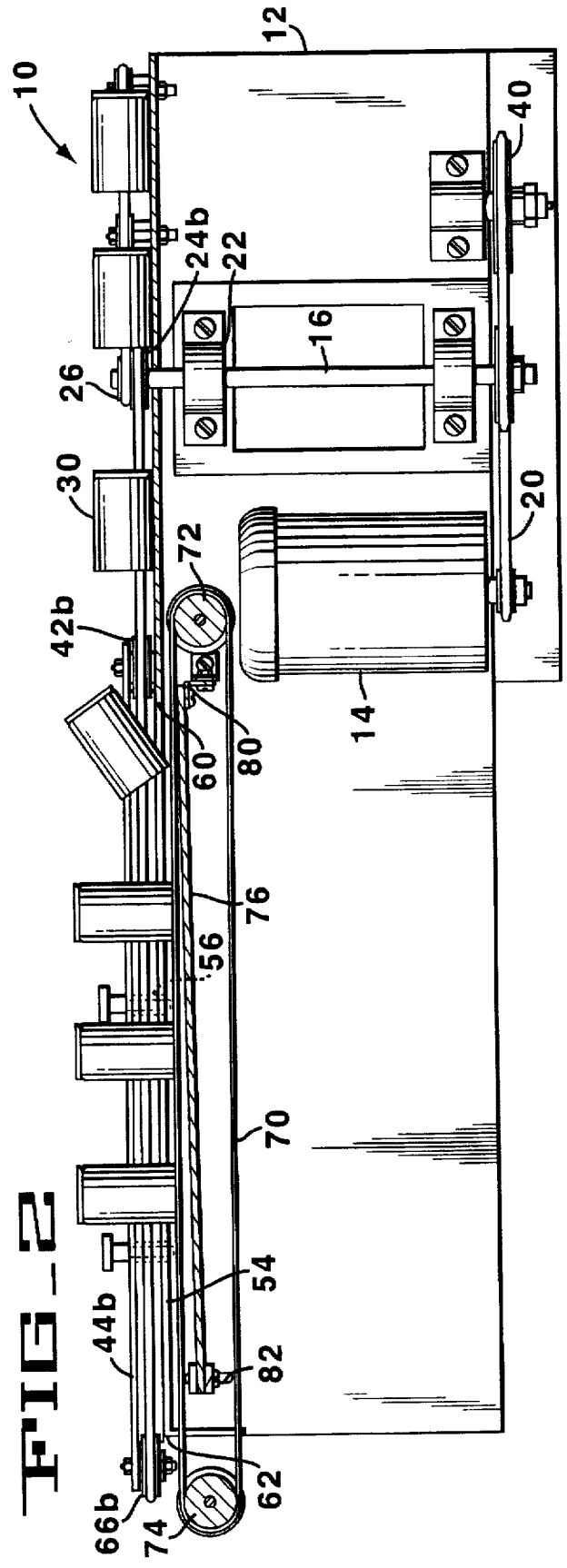

DIVERGENT CONTACT CABLE CAN HANDLING APPARATUS

BACKGROUND OF THE INVENTION

This invention has to do with apparatus for reorienting, rotating or turning articles, specifically cans of food, from a horizontal deployment to a vertical or upright deployment. More specifically, this invention grasps a can between a pair of contact cables when the can is in a horizontal deployment. The contact cables will transport the cans into a zone where the contact cables diverge. The contact cable divergence allows the cans to rotate into the desired vertical position.

DESCRIPTION OF THE PRIOR ART

In prior art can reorienting devices, it is known to rotate cans ninety degrees while in an unstable "on edge" position to a second "on edge" position. (J. Boyce, U.S. Pat. No. 3,462,001) This prior art patent uses a pair of conveying surfaces driven at different speeds to turn the cans ninety degrees. A second method of handling cans to move them from a horizontal position to a vertical position is shown in U.S. Pat. No. 3,640,375. This patent uses a pair of associated wheels operating at different speeds to handle the cans. This patent also teaches a magnetic stabilizing conveyor to "grip" one end of each can as the can completes its rotation. A third method of reorienting cans is by means of a Can Erector Unit available from FMC Corporation. This method does not use the diverging cables set forth in this invention.

SUMMARY OF THE INVENTION

The apparatus provided here will process a continuous stream of articles, in a preferred embodiment it is expected that these articles will be food containing cans, such as cans of fruit, vegetables and the like, which exit a canned product processing station. It is usual for this processing station to be a continuous sterilizer or cooker. A preferred processing device would be a Hydrostatic Sterilizer available from FMC Corporation. The cans will come from the processing station deployed horizontally and often in an abutting relationship. The article handling apparatus provided herein will take these horizontally disposed cans and rotate them from a horizontal position to a vertical position. This rotation is accomplished by releasing can contacting contact cables or belts which are in contact with the can when the can is horizontal. The release is gradual starting from the leading end of the can. As the contact cables are gradually released the freed portion of the can will be unsupported and, through the force of gravity, the end of the can will rotate to the vertical position.

The gravitational force can be augmented or enhanced by the use of a magnetic element associated with the conveyor belt onto which the can has landed after rotation.

One object of this invention is to rotate cans from a horizontal or laid-down position to a vertical or up-right deployment at very high speeds, with minimal intrusive can contact, capable of handling cans of different sizes, in a repeatable manner in as quiet as possible apparatus.

BRIEF DESCRIPTION OF THE DRAWINGS

FIG. 1 is a plan view of the apparatus with some parts broken away for clarity.

FIG. 2 is an elevation view of the apparatus shown in FIG. 1 through Section 2-2 thereof, with some parts broken away and shown in sectioned presentations for clarity.

DESCRIPTION OF THE PREFERRED EMBODIMENT

The high speed article turning device can best be envisioned by looking at the drawing figures together. Like parts between views share like identification numbers.

The apparatus, generally 10, includes a support structure shown graphically as 12 that supports the actual can turning equipment. The support structure also supports a drive motor 14, which could be an electric motor of conventional type. The drive motor 14 drives a line shaft 16 by means of a belt 20. The line shaft 16 can be supported on journals such as 22. The line shaft 16 includes belt sheaves 24 and 26 at its relative upper end. These sheaves 24 and 26 will be used to drive cables that will contact the articles or cans to be turned from horizontal to vertical deployment.

The articles to be turned, in this case, cans identified as 30, can best be envisioned going through the rotation process in FIG. 2. The round cross section cables, generally plastic-coated cables, that contact the cans are easiest to comprehend from studying FIG. 1.

A first set of cables, 32a and 32b, are driven by sheave 26 in a direction to move any cans that contact either of the cables toward the can turning portion of the apparatus which is shown to the left of these cables. A tension device such as 34 may be associated with the cables 32a and 32b to maintain cable tension as is conventional in belt/pulley arrangements.

Sheave 24b drives contact cable 36b while sheave 24a drives contact cable 36a. Both sheaves are driven by the motor 14 in unison, but in opposite direction, by the belt 20 which is a serpentine belt trained around idler 40.

The belt diverging apparatus starts with idlers 42a and 42b which contact the contact acceleration cables immediately before the contact cables are directed slightly away from each other.

It should be pointed out that the can contacting acceleration cables 32a and 32b and 36a and 36b are round cables with a friction enhancing surface. The cables are well known in the industry as Volta cables having a diameter of ⅜ inch.

A pair of upper frame members 44a and 44b are pivotally mounted to the support structure 12 to pivot around the axle center point of the idlers 42a and 42b. Several tension knobs such as 46 have threaded shafts that pass through elongated slots such as 50 in the upper frame members 44. The tension knobs 46 thread into threaded bores, one shown as 52, in the support structure 12, specifically into the top plate 54. A stanchion such as 56 will act as a spacer to prevent the upper frame members 44 from being deflected toward the top plate 54 when the knobs are tightened.

The top plate 54 is provided with a cut out portion beginning at 60 and extending to the outboard end of the top plate represented by edge 62. The cut-out portion will allow cans to fall past the surface of the top plate to the take-away conveyor 70.

The upper frame members 44a and 44b terminate at their out board ends with cable pulleys 66a and 66b around which the contact cables 36a and 36b are entrained.

As best seen in FIG. 2, a take-away conveyor 70 is provided. This conveyor 70 is positioned under the cutout portion 60-62 of the top plate 54 and will be the surface upon which the cans land as they are rotated from the horizontal position to the vertical position. The conveyor is entrained around a drive roller 74 and an idler/turn roller 72 in a conventional manner.

A magnetic element 76, a long magnet surface, is pivotally mounted underneath the upper run of the conveyor belt 70. It is hinged at 80 and adjustably fixed at 82 to be moved closer to or further away from the bottom surface of the upper run of conveyor. The cans shown as 30 for instance will be provided with a ferromagnetic bottom element that would be attracted to the optional magnetic element 76.

In operation the cables 36a and 36b will run at a slightly faster linear velocity than the upstream discharge conveyor or cable set 32a and 32b. This will allow the cans or containers to be pulled apart from the nested relationship they are in when they leave the upstream hydrostatic sterilizer.

The unnested cans 30 enter the bight between cables 36a and 36b in a horizontal deployment as shown. The cables 36a and 36b will contact the cans on opposing locations generally below the horizontal centerline of the can. This location is also, most usually, below the center of gravity of can and can contents. The cables will now pull the can into the cable divergence zone where the cables will start to gradually diverge from one another. At this point the top plate is cut away, point 60, and the can will no longer be supported.

As the cables 36a and 36b diverge slightly less of the cable surface will contact the can. The unsupported portion of the can will tend to rotate the can gently as the can slips more on the cable's friction inducing surface. The more the cables diverge, the less surface there is in contact between the can and the cable and the faster the can will rotate.

The can rotates into contact with the upper surface of the upper run of the take away conveyor. The magnet element beneath the upper run of the conveyor will assist in stabilizing the can on the conveyor and may also tend to urge the ferromagnetic portion of the can to rotate faster than it would if the rotation was driven simply by gravity overcoming the friction between the can 30 and the diverging cables 36a and 36b.

Once the cans are on the take away belt they will be transported by the belt to the next processing zone. This could be, for instance, a labeler.

What has been presented is an article handling apparatus for transitioning an article from a horizontal position to a relative vertical position wherein the article has a cylindrical non-tapered configuration with at least one end thereof providing a stable base. Means for transporting the article in a horizontal position is provided. This means includes a pair of contact cables with one of each of said pair of cables positioned to contact said article on opposite sides of the article. At least one divergent cable guide contacts at least one of said contact cables, said divergent cable guides allowing divergence of said contact cables whereby the divergence of the contact cables decreases the magnitude of contact between said contact cables and said articles at the leading portion of said article allowing said horizontal articles to rotate into a vertical position.

Another embodiment of the invention includes a slight modification to the invention. In this alternative embodiment the diverging cables and the diverging cables ancillary structure, such as the cable guides, will be inclined out of the horizontal plane shown in FIG. 2. The incline could be slightly upward from the input end of the cable set to the outboard end of the divergent cable set. This would allow cans to be picked up from a horizontal conveyor by the input end of the divergent cable set and then carried up the slight incline before they are gently deposited back on the same conveyor. This would allow retrofit of the invention to existing conveyor systems in an even less intrusive and lower cost manner. In this embodiment the cut-out table structure would be unnecessary but the take-away conveyor would have to be immediately under the divergent cable system.

Although the best mode of carrying out this invention has been herein shown and described, it will be apparent that modification and variation may be made to the invention without departing from what is regarded as being the subject of the invention.

What is claimed is:

1. Apparatus for erecting substantially cylindrical containers, each of which has a base and a cylindrical portion defining a cylindrical axis, from a laid down position in which said axis is horizontal to an upright position in which said axis is vertical, comprising:

a pair of driven cables positioned with one on each side of said axis and supported to drive the containers in said laid down position with the base thereof leading;

said cables diverging from each other to allow gravity to initially rotate said base downward; and a take-away conveyor position beneath said cables and sufficiently close thereto to receive the containers as they rotate to said upright position.

2. The invention according to claim 1, wherein at least said base of each container is formed of a ferromagnetic material, and said apparatus further comprises a magnet positioned below and in close proximity to said take-away conveyor to accelerate the rotation of the cans to an upright position.

3. The invention according to claim 2, wherein said magnet has a downstream end, and said apparatus further comprises an adjustment means for selectively securing at least the downstream end of said magnet at a predetermined distance from said conveyor.

4. The invention according to claim 1, and further comprising a plate extending under and parallel to said cables for at least partial supporting said containers while in said laid down position, and said plate having a cut out portion to permit the containers to rotate as said cables diverge.

5. The invention according to claim 1, wherein the distance between said pair of cables at the upstream end is less than the diameter of said cylindrical containers and said pair of cables are positioned below the horizontal axes of the containers.

6. The invention according to claim 5, wherein said cables have a friction enhancing outer surface.

* * * * *